3,245,544
SEDIMENTATION TANK HAVING ROTATABLE SEDIMENT CONVEYING STRUCTURE

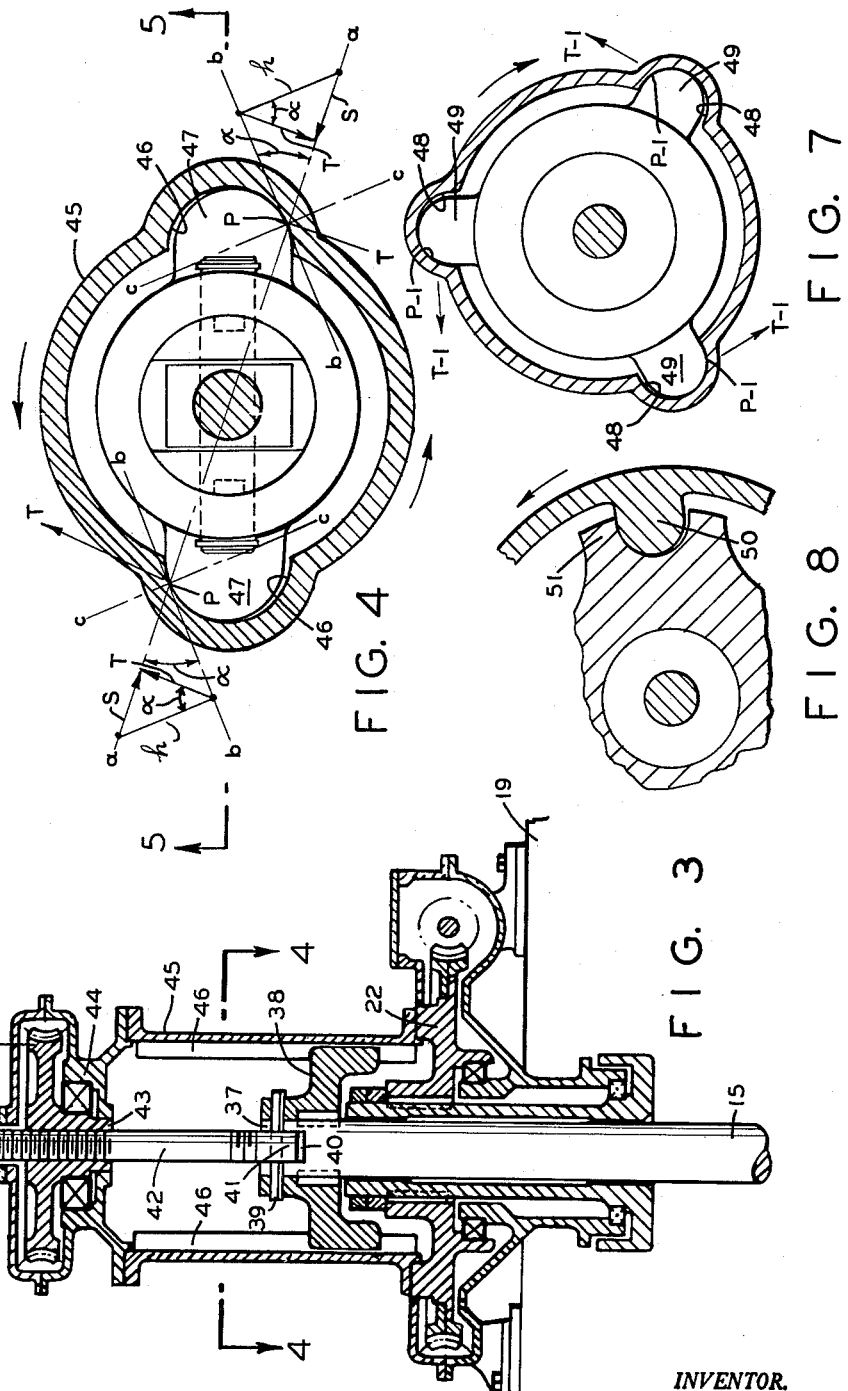

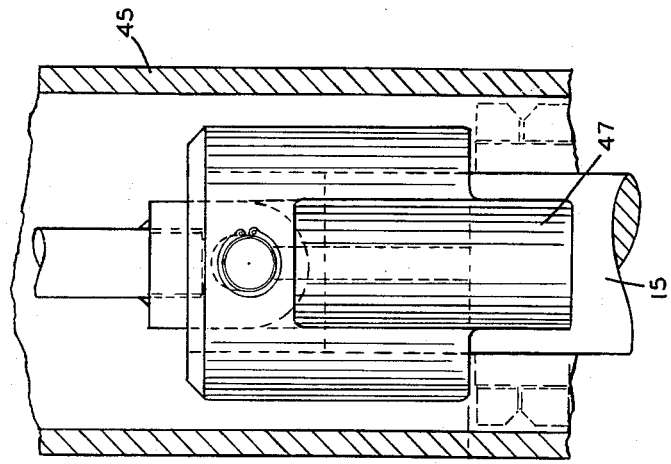
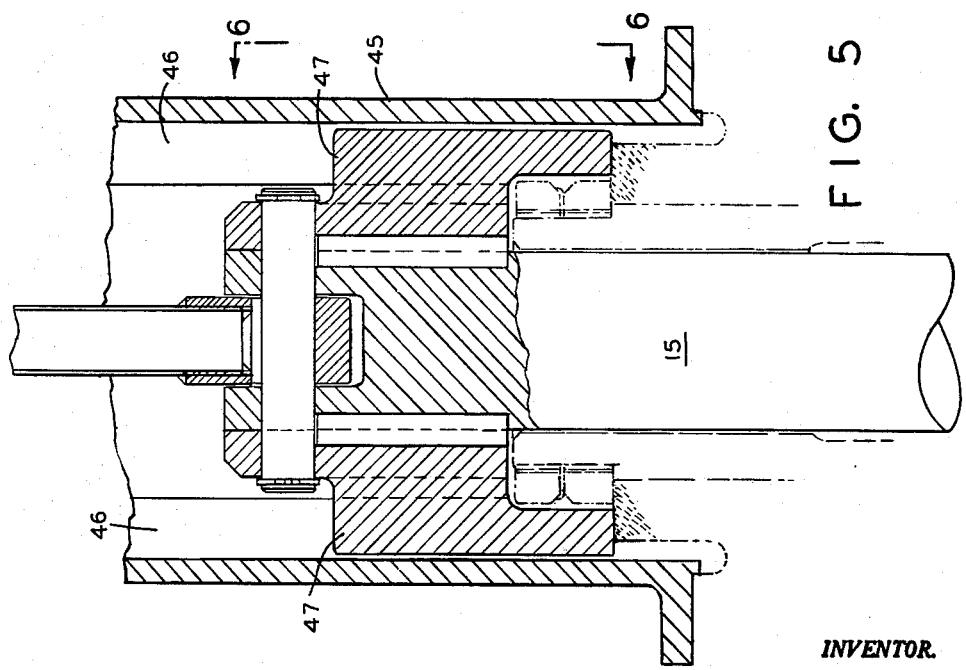

Paul Ingemann Petersen, Mount Vernon, Ohio, assignor to Dorr-Oliver Incorporated, Stamford, Conn., a corporation of Delaware
Filed Nov. 19, 1962, Ser. No. 238,573
4 Claims. (Cl. 210—531)

This invention relates to continuously fed sedimentation apparatus wherein a driven rotary sediment conveying structure moves the sediment or sludge continuously over the tank bottom of a settling tank to an outlet means while supernatant liquid overflows continuously from the tank.

More particularly, the invention is concerned with improvements in a type of sedimentation apparatus wherein the sediment conveying structure comprises a vertical shaft supported from a main drive gear structure or like, where the gear structure is mounted for rotation in a casing means supported relative to the tank. Rotation of the shaft causes the rake means to move sediment to the outlet means.

Furthermore, in the type of sedimentation apparatus herein contemplated, means are provided for enabling the operator to raise the sediment conveying structure from the tank bottom for instance in order to overcome undue sludge accumulation or sludge load on the rake means of this structure, and thereafter to lower the structure again to its normal operating position relative to the bottom of the tank. Therefore, the drive mechanism for the sediment conveying structure comprises a drive gear wherein the shaft member is axially shiftable, which drive gear may be driven by a worm.

It is one of the objects of this invention to provide improved and efficient drive means for the sediment engaging structure whereby a balanced torque may be applied from the main drive gear structure to the shaft, even though the shaft be axially shiftable therein, so as to enable the shaft to be shifted freely when raising or lowering the sediment engaging means even when the same are operating under load.

It is furthermore among the objects to provide in this type of apparatus an improved drive mechanism having extremely simple and effective balanced torque transmitting means of great compactness, and which are easily accessible and readily assembled, and which because of their simplicity and compactness minimize production costs.

This invention is concerned with a type of drive mechanism wherein torque transmitting means are effective between the top end portion of the shaft and a torque tube member mounted on the main drive gear coaxially surrounding the shaft, and carrying the devices that are operatively connected to the shaft and whereby the rake structure or sediment conveying structure may be either raised or lowered, with the shaft guided along vertical torque transmitting tracks provided interiorly of the torque tube member and engaged by torque transmitting means carried by the top end portion of the shaft.

This invention aims to provide mechanism wherein a balanced torque can be transmitted from the torque member of the main drive gear to the shaft even though only one pair of tracks need be employed for torque transmission. However, for instance a triple track arrangement may be advantageously employed, for example, for handling larger torques.

With the foregoing objects in view, the invention provides a torque receiving member fixed to the top end portion of the shaft. In one embodiment, this member is formed with at least a pair of outwardly extending torque receiving lug portions substantially equally spaced from one another about the shaft axis, each lug portion presenting a convex line of contact engageable by a driving member.

The torque tube member is formed interiorly with vertical torque imparting tracks the profile of which has a concavely shaped contact portion of slightly greater radius of curvature than that of the convex contact line of the lugs and thereby adapted to have self-balancing pressure contact therewith, whereby an equal share of the driving torque is received by each of the lugs from said gear.

In case of larger torques, it may be advantageous to embody the above torque balancing features in a triple track arrangement wherein each track cooperates with a respective lug in the manner pointed out above, with the tracks substantially equally spaced from one another about the axis of the shaft. Moreover, the parts may be reversed, that is with the concavities formed on the torque receiving member and convexities formed on the tracks.

Other features and advantages will hereafter appear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims:

In the accompanying drawings:

FIG. 3 is a somewhat enlarged and more detailed view of the drive mechanism shown in FIG. 1;

FIG. 4 is a further enlarged cross-sectional view of the drive mechanism taken on line 4—4 of FIG. 3, illustrating the operation of the self-balancing torque transmitting means effective between the torque tube and the shaft;

FIG. 5 is a vertical sectional view of the self-balancing torque transmitting means taken on line 5—5 of FIG. 4;

FIG. 6 is a side view of the torque transmitting means taken on line 6—6 of FIG. 5, with the wall of the torque tube member broken away;

FIG. 7 is a cross-sectional view of another form of the mechanism, illustrating triple track arrangement;

FIG. 8 is a detail view of a modified form of the torque transmission means.

Figure 1:
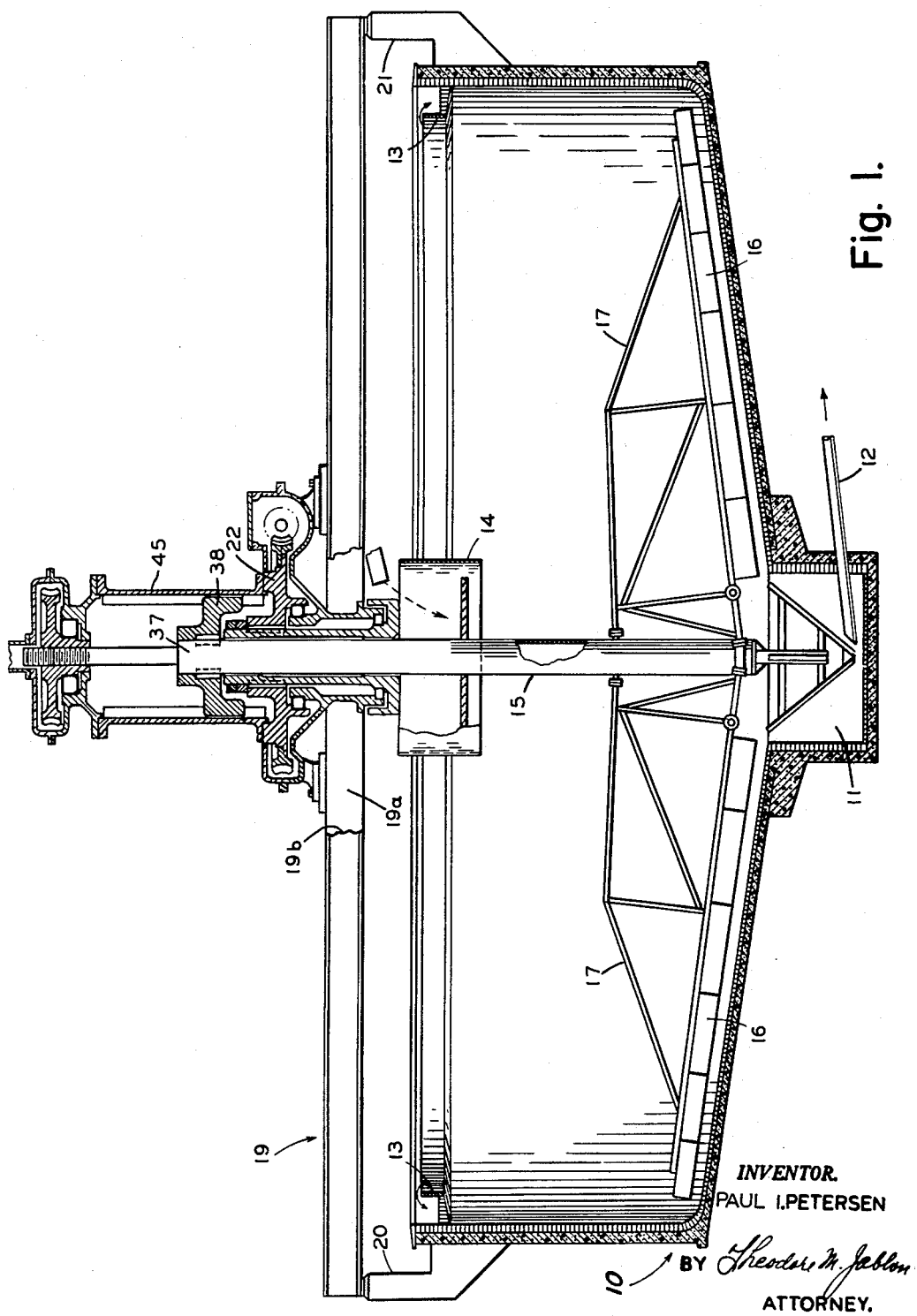
FIG. 1 is a vertical sectional view of the sedimentation apparatus with rake drive mechanism featuring the improved self-balancing torque transmitting means effective between the main drive gear and the shaft.

As illustrated in the example of FIG. 1, the invention is embodied in a sedimentation apparatus comprising a round sedimentation tank 10 having a shallow conical bottom provided with central sump 11 receiving sediment or sludge conveyed thereto over the bottom by rotary sludge conveying means, having a sludge withdrawal conduct or pipe 12 leading from the sump.

The tank wall is provided at the top end with an overflow launder 13 receiving clarified liquid, and with a discharge means therefor not shown. A feed suspension or slurry is delivered continuously into a cylindrical feedwell 14 located centrally of the tank and surrounding the vertical shaft 15 of a rake structure which has sediment conveying means or raking blades 16 carried by rake arms 17 extending from the lower end portion of the shaft. The rake structure when rotated is effective to convey the sediment or sludge over the tank bottom into the sump for withdrawal through pipe 12, while clarified liquid overflows into launder 13.

Supporting structure 19 for the sediment conveying apparatus may be in the form of a bridge construction spanning the tank, preferably comprising a pair of parallel beams 19a and 19b extending across the top of the tank, the beams being shown supported at their respective ends by respective columns 20 and 21 or the like.

The sediment raking apparatus of this invention with an improved drive mechanism comprising novel means for attaining a self-balancing driving torque, is mounted on the bridge construction 19, with the shaft of this structure arranged for axial movement in order that the rake means may be raised or lowered relative to the bottom of the tank.

Figure 2:
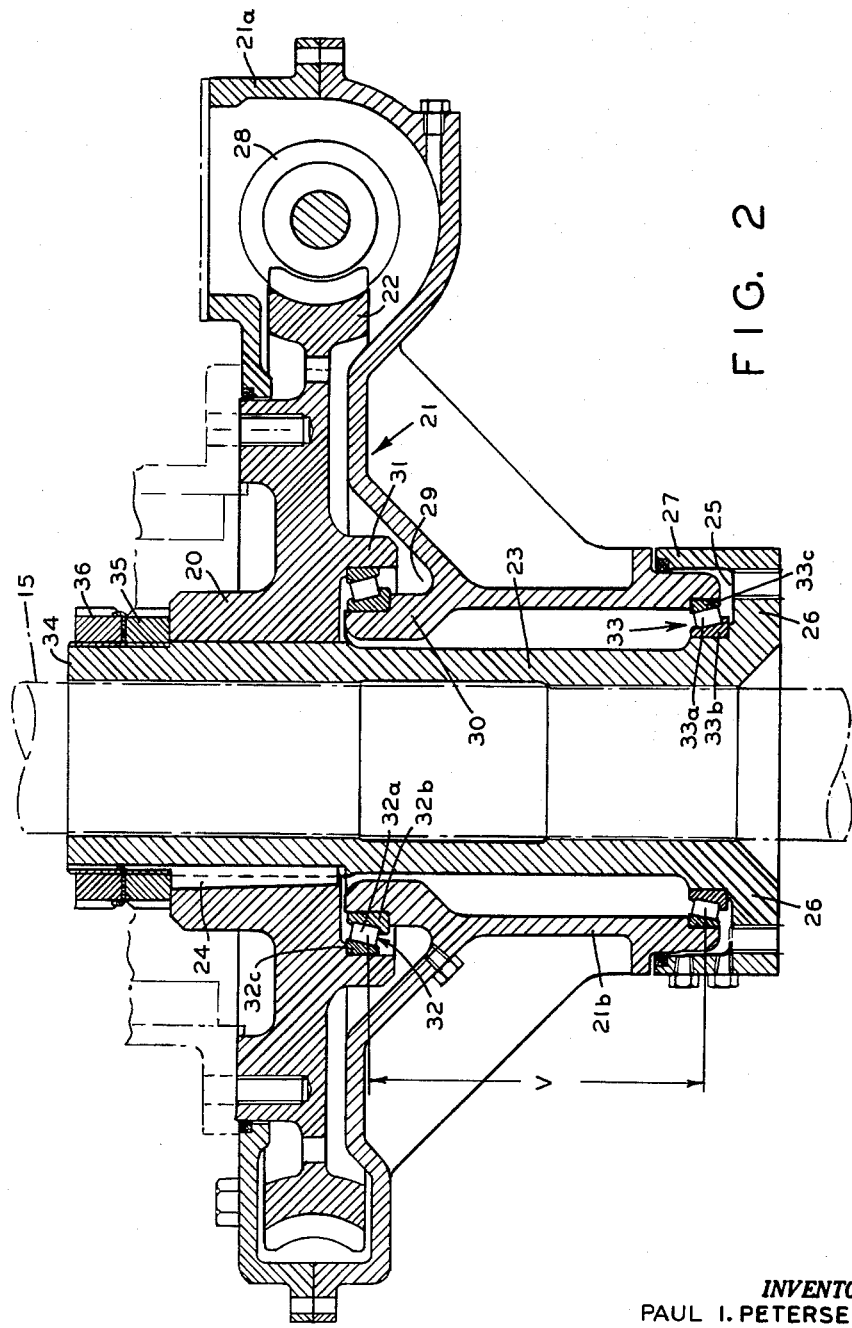
FIG. 2 is a greatly enlarged and more detailed vertical sectional view of the mounting of the main drive gear of FIG. 1.

Referring more particularly to the enlarged view in FIG. 2 of the drive mechanism, the shaft of the rake structure is shiftable in a gear or gear structure 20 which in turn is mounted for rotation in a gear casing 21 preferably in the manner disclosed in copending patent application of Cookney and Petersen Serial No. 204,809, filed June 25, 1962. In this gear structure a worm gear 22 is fixed to the upper end portion of a sleeve member 23 as indicated by key connection 24. The lower end portion of the sleeve member is formed with an external annular trough 25 comprising the bottom portion 26 and a peripheral wall portion 27 rising from the bottom portion 26.

The gear casing comprises an upper shallow portion 21a surrounding the drive gear proper, and also accommodating a worm member 28 engaging the worm gear 22 for rotating the same. Power drive for the worm member is here not shown. This upper casing portion has a narrower downward cylindrical extension or lower casing portion 21b terminating within the annular space defined by the aforementioned annular trough 25 formed by the sleeve member of the gear.

At the juncture of the upper and the lower casing portions, the casing is formed with an inner annular trough 29 having an inner peripheral wall 30. The gear 22 in turn is formed at the underside thereof with an annular ridge portion 31 extending into the annular trough.

The gear structure is mounted for rotation in the casing by means of an upper conical roller bearing 32 cooperating with a lower conical roller bearing 33, both roller bearings having upwardly converging roller axes, and being spaced a substantial vertical distance V one from the other, thereby providing a stable base in conjunction with certain means for adjusting bearing tolerance described below.

More particularly, the upper bearing 32 located within the upper annular trough 25 has conical rollers 32a operating between an inner race member 32b seated around the aforementioned inner peripheral wall 30 of the casing and an outer race member 32c seated within the annular depending ridge portion 31 of the gear. The annular troughs 25 and 29 are kept filled with lubricating oil, thus providing an oil bath for the respective bearings 32 and 33 located therein.

The lower bearing 33 located within the lower annular trough, comprises conical rollers 33a operating between an inner race member 33b seated around the lower end of the sleeve member of the gear, and an outer race member 33c seated within the lower end portion of the casing.

The sleeve member of the gear construction has an upper externally threaded extreme end portion 34 extending somewhat beyond the top face of the hub of gear 22, far enough to accommodate a pair of locknuts 35 and 36 tightened against said top face of the hub only sufficient to insure proper operating tolerance in the bearings 32 and 33.

The shaft 15 of the rake structure in turn has an extreme upper end portion 37 (see FIG. 3) extending somewhat beyond the top end face of the sleeve member, and surrounded by and keyed to a torque receiving member 38 adapted to rest upon the top face of the sleeve member when the rake structure is in its lowermost operating position, said member 38 being furthermore described below.

A pin member 39 extends transversely through the hub portion of the member 38, and also extends transversely through an axial recess 40 provided in the top end face of the shaft. The pin member is surrounded by anchoring member 41 fixed to the lower end of a screw spindle 42. At its upper end, the screw spindle is engaged by an actuating nut or drive gear 43 mounted for rotation in a supporting plate member 44 wherein the nut or gear is secured against axial displacement. The drive means for this nut or gear are here not shown. This plate member is mounted so as to close the top end of a vertical torque tube member 45 mounted upon and fixed to the drive gear 22 and furthermore described below in relation to the aforementioned torque receiving member 38. The actuating nut may be rotated in any suitable manner for imparting axial movement to the spindle whereby the rake structure may be either raised or lowered.

According to one embodiment of the invention, a balanced driving torque is transmitted from the gear structure to the shaft in the manner illustrated in FIGS. 3 to 6.

Accordingly, the torque tube member 45 is provided interiorly with a pair of vertical tracks 46 arranged opposite to one another. The tracks in this example are in the form of grooves having a profile of semicircular configuration, cooperating with a pair of correspondingly disposed and shaped torque receiving lug portions 47 formed on the torque receiving member 38. These lug portions or lugs 47, as seen in FIG. 4, also have a semicircular profile although defined by a radius of curvature slightly smaller than that of the grooves. Because of this difference in radii each lug and its respective groove is eccentric with respect to one another to provide a relative difference between the curvature of each lug and its respective groove, as shown at 47 and 46 in FIG. 4. Accordingly, the tolerances are such that the lugs will seek the points of pressure P contact with the grooves, where equal shares of the driving torque are transmitted to each lug.

A balanced torque condition thus attainable is illustrated graphically by way of the force diagrams shown in FIG. 4 resulting in a pair of interbalanced tangential torque forces T. In these diagrams, the pressure contact point P of each lug is the point of intersection of the diametrical line $a$—$a$ with a line $b$—$b$ which is tangential to the curvature of the lug, these two lines defining an enclosed angle $\alpha$ determining the relative sizes of the tangential torque force T and the radially directed interbalancing force S as seen from the force triangle wherein the hypotenuse $h$ as well as line $c$—$c$ are normal to the line $b$—$b$.

Figure 9:
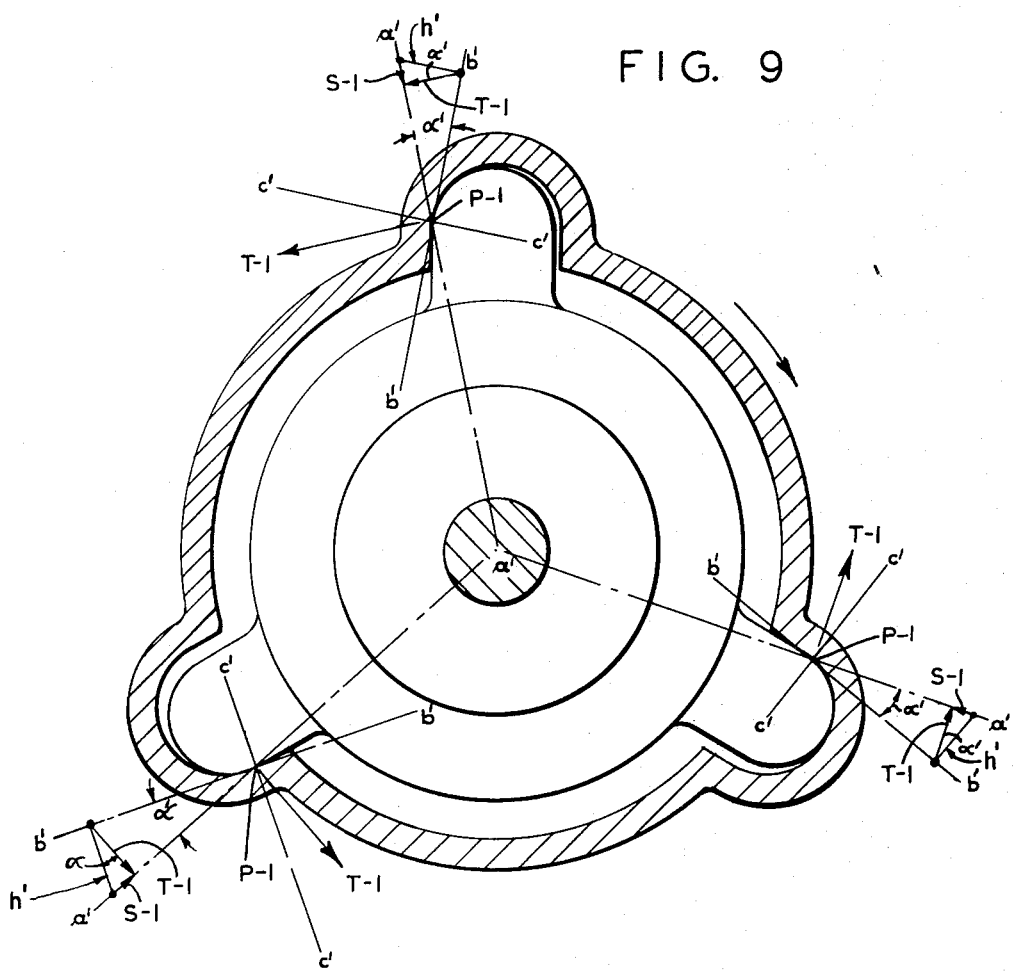
FIG. 9 is an enlarged view of the mechanism shown in FIG. 7 with force diagram illustrating the operation of the self-balancing torque transmitting means.

According to FIGS. 7, 8, and 9 the invention is shown embodied in a construction wherein the self-balancing torque effect of a triple track arrangement are combined with the self-balancing feature of this invention above set forth.

Accordingly, in this embodiment the torque tube member is formed with three vertical tracks 48 spaced substantially equally from one another about the axis, and cooperating with correspondingly arranged and shaped lug portions 49 formed on the torque receiving member on the shaft. The graphic force analysis of the driving torque transmission accordingly shows the three interbalanced pressure contact points P–1 with the resulting equal tangential torque forces T–1 in balance with one another as well as with the radially directed equalizing forces S–1. Again, the hypotenuse $h'$ as well as line $c'$—$c'$ of the force triangle are normal to the line $b'$—$b'$ which is tangential to the curvature of the lug, while line $a'$—$a'$ intersects at the axis of the shaft, enclosing with line $b'$—$b'$ the angle $\alpha'$.

FIG. 8 illustrates the reversal of the cooperating torque transmitting parts, insofar as tracks 50 may have a profile of convex semicircular configuration, whereas a torque receiving member 51 on the shaft is formed with correspondingly shaped and arranged recesses 52 having a profile of concave semicircular configuration, with the tolerances such as to enable the transmission of a balanced torque.

It will be understood that each of the elements described above, or two or more together, may also find a useful application in other types of drive mechanisms differing from the ones described above.

While the invention has been illustrated and described as embodied in a drive mechanism for the sediment conveying rake structure and settling tanks, it is not intended to be limited to the detail shown, since various modifications and structural changes may be made without departing in any way from the spirit of this invention.

I claim:

1. In a continuously operating sedimentation apparatus having a settling tank with overflow means at the top and sediment outlet means at the bottom, sediment conveying apparatus which comprises
   (a) a vertical shaft carrying sediment raking means at its lower end portion, said sediment raking means being rotatable for moving sediment to said outlet means;
   (b) a drive gear structure concentrically associated with the upper portion of said shaft, said shaft having axially sliding relationship with said gear structure and mounted for substantial vertical shifting movement relative to the gear structure to adjust the raking means to varying conditions;
   (c) a torque tube member fixed to said drive gear structure concentric therewith, and provided internally with a set of at least two grooves equally spaced from one another about the axis of rotation and each of substantially semi-circular cross-sectional profile and of a length at least equal to the desired vertical movement of the raking means;
   (d) a torque receiving member connected to the upper end portion of said shaft, and provided with a set of at least two outwardly extending torque receiving lugs each having a surface of substantially semi-circular cross-sectional profile of slightly smaller radius than the profile radius of said grooves, each semicircular lug surface and its respective groove being eccentric with respect to one another to provide a relative difference between the curvature of each of said lug surfaces and its respective groove and engaging in respective grooves, whereby said grooves constitute tracks for the respective associated lugs when said shaft is axially shifted relative to said drive gear for raising and lowering the sediment conveying raking means in the tank, with said lugs surfaces adjusting themselves in tangential contact with their respectivee grooves to establish balanced drive torque transmission from the gear structure to said shaft, whereby resistance to the raising and lowering movement of the shaft under torque load is minimized;
   (e) a casing structure wherein said drive gear structure is mounted for rotation;
   (f) horizontal support structure extending transversely of the top portion of the tank for mounting said casing structure and supporting said shaft in vertical position;
   (g) and actuating means for raising and lowering said shaft and sediment raking means.

2. The apparatus according to claim 1, wherein there are provided three of said grooves substantially equally spaced from one another, as well as three of said lugs each in torque transmitting relationship with a respective groove.

3. In a continuously operating sedimentation apparatus having a settling tank with overflow means at the top and sediment outlet means at the bottom, sediment conveying apparatus which comprises
   (a) a vertical shaft carrying sediment raking means at its lower end portion, said sediment raking means being rotatable for moving sediment to said outlet means;
   (b) a drive gear structure concentrically associated with the upper portion of said shaft, said shaft having axially sliding relationship with said gear structure and mounted for substantial vertical shifting movement relative to said gear structure to adjust the raking means to varying conditions;
   (c) a torque tube member fixed to said drive gear structure concentric therewith, and provided internally with a set of at least two inwardly extending vertical lugs equally spaced from one another about the axis of rotation and each having a surface of substantially semi-circular cross-sectional profile and of a length at least equal to the desired vertical movement of the raking means;
   (d) a torque receiving member connected to the upper end portion of said shaft, and provided externally with a set of at least two vertical grooves each of substantially semi-circular cross-sectional profile of slightly larger radius, than the profile radius of said lug surfaces, and engaging respective lug surfaces, each of said lug surfaces and its respective groove being eccentric with respect to one another to provide a relative difference between the curvature of each lug surface and its respective groove whereby said lugs constitute tracks for the respective associated grooves when said shaft is axially shifted relative to said drive gear for raising and lowering the sediment conveying raking means in the tank, with said grooves adjusting themselves in tangential contact with their respective lug surfaces to establish balanced drive torque transmission from the gear structure to said shaft, whereby resistance to the raising and lowering movement of the shaft under torque load is minimized;
   (e) a casing structure wherein said drive gear structure is mounted for rotation;
   (f) horizontal support structure extending transversely of the top portion of the tank for mounting said casing structure and supporting said shaft in vertical position;
   (g) and actuating means for raising and lowering said shaft and sediment raking means.

4. The apparatus according to claim 3, wherein there are provided three of said lugs substantially equally spaced from one another, as well as three of said grooves each in torque transmitting relationship with a respective lug.

References Cited by the Examiner

UNITED STATES PATENTS

| 1,220,483 | 3/1917 | Williams et al. | 64—23 |
| 2,360,817 | 10/1944 | Scott | 210—531 |
| 2,588,115 | 3/1952 | Scott | 210—531 |
| 2,724,506 | 11/1955 | Hardinge | 210—528 |
| 2,992,548 | 7/1961 | Walterscheid-Muller et al. | 64—23 |
| 3,002,400 | 10/1961 | Scott | 210—528 X |

FOREIGN PATENTS

| 725,687 | 3/1955 | Great Britain. |

REUBEN FRIEDMAN, *Primary Examiner.*

HERBERT L. MARTIN, *Examiner.*